(12) United States Patent
Maertens et al.

(10) Patent No.: US 10,906,348 B2
(45) Date of Patent: Feb. 2, 2021

(54) SURFACE COVERING PRODUCTION METHOD USING DIGITAL PRINTING

(71) Applicant: Tarkett GDL, Lentzweiler (LU)

(72) Inventors: Christophe Maertens, Wiltz (LU); Richard Peres, Wiltz (LU); Lara Raad, Wiltz (LU)

(73) Assignee: Tarkett GDL, Lentzweiler (LU)

( * ) Notice: Subject to any disclaimer, the term of this patent is extended or adjusted under 35 U.S.C. 154(b) by 252 days.

(21) Appl. No.: 16/069,329

(22) PCT Filed: Jan. 12, 2017

(86) PCT No.: PCT/EP2017/050607
§ 371 (c)(1),
(2) Date: Jul. 11, 2018

(87) PCT Pub. No.: WO2017/121825
PCT Pub. Date: Jul. 20, 2017

(65) Prior Publication Data
US 2019/0023060 A1 Jan. 24, 2019

(30) Foreign Application Priority Data
Jan. 11, 2016 (LU) .......................................... 92941

(51) Int. Cl.
*B44C 5/04* (2006.01)
*B44F 9/02* (2006.01)
(Continued)

(52) U.S. Cl.
CPC .................. *B44C 5/04* (2013.01); *B44F 9/02* (2013.01); *B44F 9/04* (2013.01); *B44F 9/10* (2013.01);
(Continued)

(58) Field of Classification Search
CPC .. B44C 5/04; B44C 5/0461; B44F 9/02–9/12; G06T 11/001; G06T 11/60
See application file for complete search history.

(56) References Cited

U.S. PATENT DOCUMENTS

| | | |
|---|---|---|
| 2007/0001558 A1 | 1/2007 | Fuller et al. |
| 2010/0046010 A1 | 2/2010 | Bauer |

FOREIGN PATENT DOCUMENTS

| | | |
|---|---|---|
| EP | 1526481 A1 | 4/2005 |
| EP | 1541373 A2 | 6/2005 |

(Continued)

OTHER PUBLICATIONS

Written Opinion of the International Searching Authority for International Application No. PCT/EP2017/050607 (dated 2017).*

*Primary Examiner* — Christopher J Besler
(74) *Attorney, Agent, or Firm* — Reinhart Boerner Van Deuren P.C.

(57) ABSTRACT

A method of producing a decorative surface covering comprises generating one or more synthetic images. The generation of these images includes arranging local prototype motifs characteristic of a material to be mimicked in a random manner and generating or preserving continuity between the local prototype motifs in such a way as to yield globally an appearance of the material to be mimicked, digitally printing one or more synthetic images on a printing substrate, and assembling the printing substrate with one or more backing layers and/or one or more transparent top layers so as to form the decorative surface covering.

16 Claims, 7 Drawing Sheets

(51) Int. Cl.
  *B44F 9/04*  (2006.01)
  *G06T 11/00*  (2006.01)
  *B44F 9/10*  (2006.01)
  *E04F 13/08*  (2006.01)
  *E04F 15/10*  (2006.01)
  *G06T 11/60*  (2006.01)

(52) U.S. Cl.
  CPC ........ *E04F 13/0866* (2013.01); *E04F 15/107* (2013.01); *G06T 11/001* (2013.01); *G06T 11/60* (2013.01); *B44C 5/0461* (2013.01); *E04F 15/10* (2013.01)

(56) References Cited

FOREIGN PATENT DOCUMENTS

| | | |
|---|---|---|
| EP | 2628610 B1 | 7/2014 |
| WO | WO 01/48333 A1 | 7/2001 |
| WO | WO 2008/040760 A2 | 4/2008 |

\* cited by examiner

SURFACE COVERING PRODUCTION METHOD USING DIGITAL PRINTING

FIELD OF THE INVENTION

The invention generally relates to a method for producing a surface covering (e.g. flooring, wall covering, etc.) having a printed decorative pattern. A further aspect of the invention relates to a surface covering obtained by the method.

BACKGROUND OF THE INVENTION

Decorative surface coverings with printed decorations are well known. Examples of such surface coverings include, without being limited to, paper-based, polymer-based and/or wood-based (e.g. high- or medium-density fibreboard-based) floor, wall or ceiling coverings. Polymer-based surface coverings (also called polymeric or synthetic surface coverings) are typically made of rubber, polyolefins, polyesters, polyamides or polyvinyl chloride (PVC).

Printed decorations imitating the aesthetic appearance of natural floorings, such as, e.g., wood or stone floorings, have an important share in the market. Other printed decorations imitate ceramic tiles.

Many decorative prints are produced by rotogravure. That process involves transferring the pattern to be printed to one or more so-called gravure cylinders. The transfer typically comprises colour separation (except when a monochromatic pattern is wanted), half-toning and engraving each cylinder with the specific halftone pattern. Each gravure cylinder is provided on its surface with cells (recesses) that receive the ink in order to transfer it to the printing substrate. The decorative pattern is obtained by the superposition of the halftone patterns on the printing support. The number of colour channels (and thus of the gravure cylinders needed) depends on the colour model used and, ultimately, on the quality requirements. Possible (subtractive) colour models are CMYK, CcMmYK, etc.

The decorative pattern obtained by rotogravure has a spatial repetition frequency depending on the circumference of the gravure cylinders: after one rotation of the cylinders, the printed pattern repeats itself. If the printed pattern is thereafter divided into surface covering elements (tiles or planks), only a limited number of different elements can be obtained. When laying out such surface covering elements, repetitions perceivable to the eye cannot be avoided in most cases. That is a relevant issue particularly if the decorative printed pattern imitates a natural surface covering because the repetition of identical areas in one room destroys the illusion of authentic wood, stone, cork, etc.

That problem has been recognized e.g. in EP 2 628 610 B1, which proposes to overlay a first decoration printed by rotogravure with a second decoration printed with a digital printer. The second decoration may comprise randomly distributed individual decorative elements, such that repetitions in the decoration can be avoided. The individual decorative elements applied by digital printing may e.g. comprise the grain and knags. EP 2 628 610 B1 mentions that decors completely devoid of repetitions may be achieved by digital printing. In practice, however, one is confronted with the problem that large-scale originals, which may be used as templates for the reproduction by printing, are extremely expensive.

Document US 2010/0046010 A1 discloses a method for producing individualized patterns from a genre-specific prototype pattern. The method aims at producing printed surfaces, recognizable as belonging to a genre but customized, i.e. different one from the other, similar to surfaces of natural products. It is alleged that the disclosed method makes it possible that no parquet blocks are produced with identical surfaces. Taking a closer look at the proposed method reveals that the electronic modification of the prototype pattern uses basic operations like rotating about an axis, mirroring, enlarging, reducing, distorting, lightening or darkening the colour, changing the contrast and changing the colour curve. Mirrored pattern elements may be put together so as to continuously transition into each other at the symmetry line. Despite the stated aim, experience shows that realistic natural surfaces cannot be simulated that way, in particular, because the proposed operations do not effectively conceal repetitions of the prototype patterns to human observers.

SUMMARY OF THE INVENTION

A first aspect of the invention pertains to a method of producing a decorative surface covering, e.g. a decorative wall or floor covering, comprising:
generating one or more synthetic images, generation of the one or more synthetic images including:
arranging (placing, distributing) local prototype motifs characteristic of a material to be mimicked in a random manner and generating or preserving continuity between the local prototype motifs in such a way as to yield globally an appearance of the material to be mimicked;
digitally printing one or more synthetic images on a printing substrate; and
assembling the printing substrate with one or more backing layers and/or one or more transparent top layers so as to form the decorative surface covering.

Preferably, the synthetic image mimics a surface of natural material, e.g., selected from the group consisting of stone, wood, bamboo, cork and metal.

Optionally, the decorative surface covering is cut into tiles, planks, stripes or into any other form suitable for the sale or the delivery to the customer. Advantageously, connection profiles may be machined into the side edges of any surface covering elements (tiles, planks, stripes, etc.) thus obtained. As used herein, "machining" implies the removal of matter (e.g. by cutting away, abrading or the like) from the edges of a surface covering element using one or more machines.

As used herein, the term "local prototype motif" refers to a primary image or shape available in digital form prior to the generation of the synthetic image or dynamically generated at the beginning of that process. The primary image or shape could be a part of a photograph or a three-dimensional representation (e.g. from a tomography of the material to be mimicked). The primary image or shape could also be computer-generated. It is worthwhile noting that the local prototype motifs need not have all details and attributes (e.g. colour) of the final synthetic image as such details and attributes could be added during the processing. The qualifier "local" in the expression "local prototype motif" is used to indicate that the local prototype motifs are small in comparison with the size of the synthetic image to be generated. The global appearance of the material to be mimicked is typically obtained by combinations of numerous local prototype motifs.

It may be worthwhile noting that the above-listed actions forming part of the synthetic image generation process need not be carried out as separate steps and need not be carried out in the indicated order, which may, however, be preferred in certain embodiments.

Generation and/or arrangement of the local prototype motifs may involve exemplar-based texture synthesis (using various underlying processes such as, e.g. image quilting, multiscale locally Gaussian modelling, image anamorphose, random mosaic, Simoncelli algorithms, Efros-Freeman algorithms or the like), procedural texture synthesis or a hybrid approach combining elements from exemplar-based and from procedural texture synthesis.

Preferably, at least part of the plurality of local prototype motifs are retrieved from an image database. Preferably, the image database comprises local prototype motifs from different types of materials (e.g. stone, metal, wood, bamboo, cork, etc.). Advantageously, the database also provides a finer classification of the images based upon subtypes (e.g. wood types, stone types, etc.) and allows queries based upon material type and/or subtype. Each local prototype motifs might have further attributes such as the direction of the cut across the material (e.g. flat-grain, edge grain, or end grain in case of wood), the orientation of image, the overall or dominant colour, etc.

According to a preferred embodiment of the method, at least part of the local prototype motifs are snippets from one or more photographs of one or more samples of the natural material to be mimicked. Each snippet may represent a distinctive visual motif of the respective sample. Additionally or alternatively, at least part of the local prototype motifs may comprise computer-generated snippets imitating distinctive visual motifs of the natural material to be mimicked. In case of wood, the local prototype motifs may e.g. represent the grain or knags of the wood.

In the context of the present document, the qualifier "random" is used to designate both the results of truly random processes and statistically random results ("pseudo-randomness") obtained from deterministic (or partly deterministic) processes. According to an embodiment, the local prototype motifs are generated and/or arranged in the random manner by rule-based processing using rules selected in accordance with the material to be mimicked. Arranging the local prototype motifs may be carried out in a two-dimensional (2D) space or in a higher-dimensional space. If the prototype motifs are first arranged in a three- (3D) or higher-dimensional space, a 2D manifold (a surface with a topological dimension of 2, e.g. a surface obtained by cutting through a computer-generated 3D object) may be taken as the basis of the synthetic image.

The local prototype motifs may be blended into one another for generating continuity between the local prototype motifs. Such blending may be carried out in 2D, 3D or in any higher dimension, if appropriate.

It is worthwhile noting that the local prototype motifs may all be blended into one another (e.g. using Poisson blending), which leads to a completely seamless synthetic image, or a global seamless appearance. Another option is to deliberately define joints or seams in the synthetic image and to carry out any optical blending only in the areas between those joints or seams.

Alternatively or additionally, arranging the local prototype motifs in a random manner may comprise:
  distributing the local prototype motifs in a two-dimensional canvas area in a random manner; and
  modifying and completing the prototype motifs so as to optically blend them into one another, thus producing a seamless appearance.

The term "canvas area" designates a data structure which is turned into the synthetic image. The format of the canvas area may be the same as that of the synthetic image or a different one. In the latter case, a conversion from the intermediate format into the final format is carried out. The conversion may be a separate step of the generation process or be included into other steps.

According to an interesting embodiment of the method, the local prototype motifs comprise lineal, areal or volume features and arranging the local prototype motifs in the random manner comprises coordinating the local prototype motifs in an at least three-dimensional space, and retrieving a 2D surface (e.g. a 2D, preferably differentiable, manifold) embedded in the space. The 2D surface may be a plane, in which case that plane may be directly used as the basis for the synthetic image (possibly after any coordinate transformation). If the 2D surface is curved, it may be mapped into a plane or directly into the canvas area.

As used herein, the expression "areal feature" is a feature extending in two dimensions, e.g. a stain or a colour gradient. A "lineal feature" designates an essentially one-dimensional (in terms of topological dimension) feature, such as, e.g., a straight or curved line. A "volume feature" is a feature that has volume.

Preferably, arranging the local prototype motifs (in the canvas area or in any other space) comprises prevention of repetition of each local prototype motifs within a defined radius. A monitoring process running in parallel with the distribution (arrangement) process may be used to check that the distribution does not produce unwanted repetition. Alternatively or additionally, the repetitions are detected only after the distribution process is over. When unwanted repetition is detected, the repeated prototype motif could be replaced by another one or the entire distribution process could be started over. Preferably, the defined radius amounts to at least 2 m, more preferably to at least 3 m and still more preferably to at least 4 m. It will be appreciated that the defined radius may be selected depending on the size of the local prototype motifs. As a general rule, the larger and/or the more eye-catching a prototype motif is in comparison to its peers, the greater has to be the defined radius in order to disguise any repetition to the observer. It may thus be an advantageous option to defined, for each local prototype motif individually, a radius within which that local prototype motif may not be repeated. Such information would be preferably included as an attribute of each local prototype motif in a database of local prototype motifs.

Preferably, generating and/or arranging the local prototype motifs is carried out based upon a set of rules depending on the natural material to be mimicked (using e.g. rule-based texturing techniques). For instance, each type of wood has a characteristic distribution of knags, which may be described by rules. In order to mimic wood of a certain type, one may use such rules in order to arrange local prototype motifs representing knags in the canvas area (or in any other space). The rules introduce randomness in order to avoid regular distributions having unnatural appearance.

The local prototype motifs may comprise first, eye-catching, local prototype motifs (e.g., zones with stark contrasts, such as e.g. knags, curls, defects, stain, etc.) and second, inconspicuous, local prototype motifs (e.g. zones without stark contrasts and/or zones without significant optical variation in at least one direction). In this case, arranging the local prototype motifs may advantageous be carried out by distributing the first local prototype motifs in a random manner and distributing the second local prototype motifs in-between the first local prototype motifs. The second local prototype motifs in this case are used to fill the space between the more eye-catching local prototype motifs.

According to a preferred embodiment of the method, arranging the local prototype motifs is carried out by distributing the first prototype motifs in a random manner. Generating continuity between the first prototype motifs preferably comprises distributing the second prototype motifs in-between the first prototype motifs. Alternatively, distributing arranging the local prototype motifs comprises arranging the local prototype motifs as an at least two-dimensional dense mosaic (devoid of gaps) and generating continuity between the local prototype motifs comprises modifying the prototype motifs so as to eliminate discontinuities between adjacent prototype motifs.

A second aspect of the invention relates to a method of producing a decorative surface covering, e.g. a decorative wall or floor covering, comprising receiving (e.g. over an Internet or network connection) images (e.g. photographs, roentgenograms, tomographies, etc.) of natural material acquired by a plant in which such natural material is processed (e.g. a sawmill or a quarry, etc.), buffering or storing the images (e.g. in an image database on a server or a server farm), assembling the images into a synthetic image to be printed, digitally printing the synthetic image on a printing substrate; and assembling the printing substrate with one or more backing layers and/or one or more transparent top layers so as to form the decorative surface covering.

Preferably, the images of natural material received are automatically checked for flaws. If a defect is detected, the corresponding image may be discarded for the rest of the processing. The step of reassembling the images may comprise a step of blending individual neighbouring images into one another in order to give the synthetic image a generally seamless appearance.

A random process may be used to select among the accumulated images those that are assembled into the synthetic image.

The receipt of images from the plant may take place at the same time other images (received somewhat beforehand) are printed. According to a preferred embodiment, images are excluded from printing after having been printed a defined number of times (e.g. 1, 2, 5, 10, 25, 50 or 100 times). To this end, each image may be given an attribute (counter) which stores the number of times the image has already been printed. When the counter reaches the predefined limit, the image may be removed from the database (e.g. by deleting the image) or simply be excluded from further printing. Alternatively, images may be used an indefinite number of times.

A third aspect of the invention, related to the first and second aspects, pertains to a method of producing a decorative surface (e.g. wall or floor) covering, comprising:
  digitally printing one or more synthetic images on a printing substrate, the one or more synthetic images, and
  assembling the printing substrate with one or more backing layers and/or one or more transparent top layers so as to form the decorative surface covering.

The one or more synthetic images have the following characteristics:
  they represent a total printed-out surface of at least 10 $m^2$, preferably at least 16 $m^2$, more preferably at least 30 $m^2$, still more preferably at least 40 $m^2$, still more preferably at least 50 $m^2$, still more preferably at least 60 $m^2$, still more preferably at least 75 $m^2$, yet still more preferably 100 $m^2$ and most preferably at least 128 $m^2$ of flooring,
  they comprise areal and lineal features characteristic of a material to be mimicked, the areal and lineal features being distributed over the surface so as to form a random pattern, and the areal and lineal features located within any geometrically convex subarea of at least 0.01 $m^2$ with an aspect ratio not greater than 5 form a visual motif that is unique within a radius of at least 2 m, preferably of at least 2.5 m, more preferably of at least 3 m, still more preferably of at least 4 m, yet more preferably of at least 5 m and most preferably of at least 7.5 m around the subarea; and Preferably the areal and lineal features located within any geometrically convex subarea of at least 25 $cm^2$ with an aspect ratio not greater than 5 form a visual motif (graphical pattern) that is unique within a radius of at least 2 m around the subarea.

The first, second and third aspects of the invention are not mutually exclusive. Embodiments of the invention may rely on the first, the second or the third aspect of the invention or on any combination thereof.

The term "aspect ratio" of a subarea designates, in the present context, the length-to-width ratio of the circumscribed rectangle (bounding box) of the subarea considered. The circumscribed rectangle is the smallest rectangle that can be drawn around the subarea such that the subarea is entirely contained within the rectangle.

It will be appreciated that the third aspect of the invention takes into account that repetition of visual motifs cannot easily be detected by an average observer if the above-defined criteria are met. One may consider the above-specified geometrically convex subarea as a patch or image snippet. If patches exceeding a certain size (area) are repeated in the synthetic image within a certain radius and/or are arranged in a regular pattern (unlike a random pattern) the repetition has some probability to be detected by an average observer. To some extent, the larger and/or the more eye-catching the visual motif of a patch or snippet is, in comparison to its surroundings, the greater becomes the probability that a repetition will be detected. It has been found that the above criteria allow the generation of synthetic images serving as décors of floors and walls, wherein repetition need not be totally excluded but nevertheless will remain unnoticed by almost every person.

It shall be noted that before the digital printing of the one or more synthetic images, a base coat may be gravure-printed on the printing substrate. Alternatively, the entire printing may be done using exclusively a digital printing technique.

Yet another aspect of the invention pertains to a multilayer decorative surface (e.g. wall or floor) covering fabricated in accordance with the method as described herein. The multilayer surface covering may comprise one or more core or backing layers (hidden by the print layer when the surface covering has been installed), a print layer (a thin printing substrate, the layer(s) of ink) and one or more transparent layers (top coating and/or wear layer) on top of the print layer. Printing may be effected on a dedicated substrate (e.g. a web of paper or polymeric material), which is laminated, or otherwise combined, with the other layers. Alternatively, one could directly print on one of the structural layers (e.g. a core or backing layer) or on the back of the wear layer. For instance, one could directly print on a medium or high-density fibreboard (MDF or HDF) core layer, before a protective layer is applied on top.

BRIEF DESCRIPTION OF THE DRAWINGS

By way of example, preferred, non-limiting embodiments of the invention will now be described in detail, with reference to the accompanying drawings, in which.

DETAILED DESCRIPTION OF PREFERRED EMBODIMENTS

Figure 1:
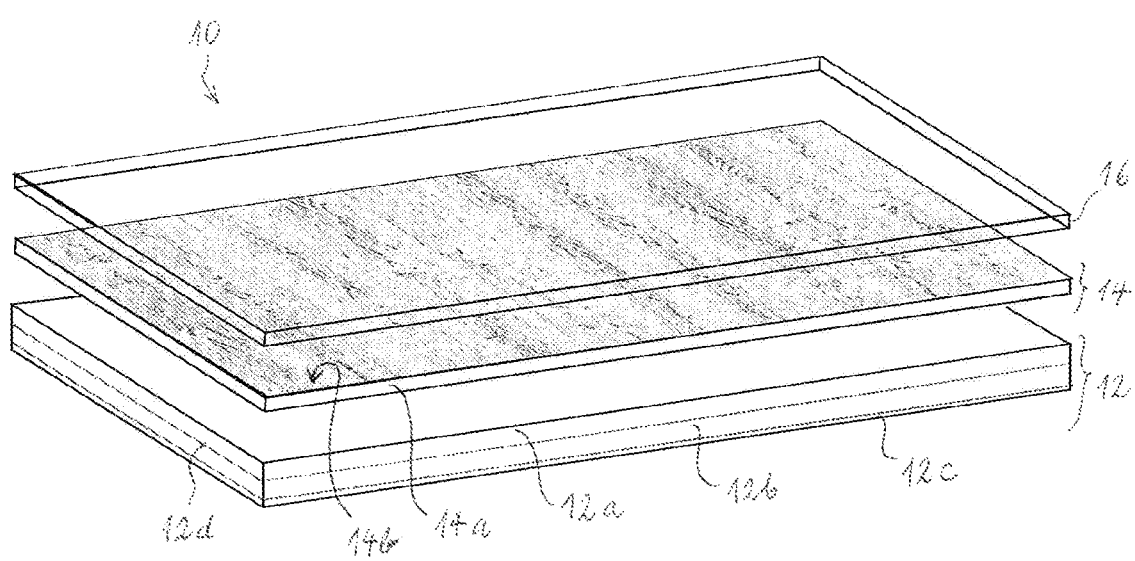
FIG. 1: is a partially exploded perspective schematic drawing of a floor covering with a printed decorative pattern.

FIG. 1 illustrates a resilient multilayer decorative floor covering (flooring) 10 imitating a hardwood floor. The floor covering comprises a substructure 12 comprising core layers 12a, 12b and a backing layer 12c. The substructure 12 supports a print layer 14 (printing substrate 14a carrying printed décor 14b). A transparent wear layer 16 is arranged as a protection on top of the print layer 14. The backing layer 12c is configured so as to mechanically counterbalance the wear layer 16, thus eliminating or at least reducing the any curling of the floor covering 10. A glass veil 12d is arranged between the core layers 12a and 12b. The glass veil is preferably arranged in the mechanically neutral plane of the floor covering 10.

Figure 2:
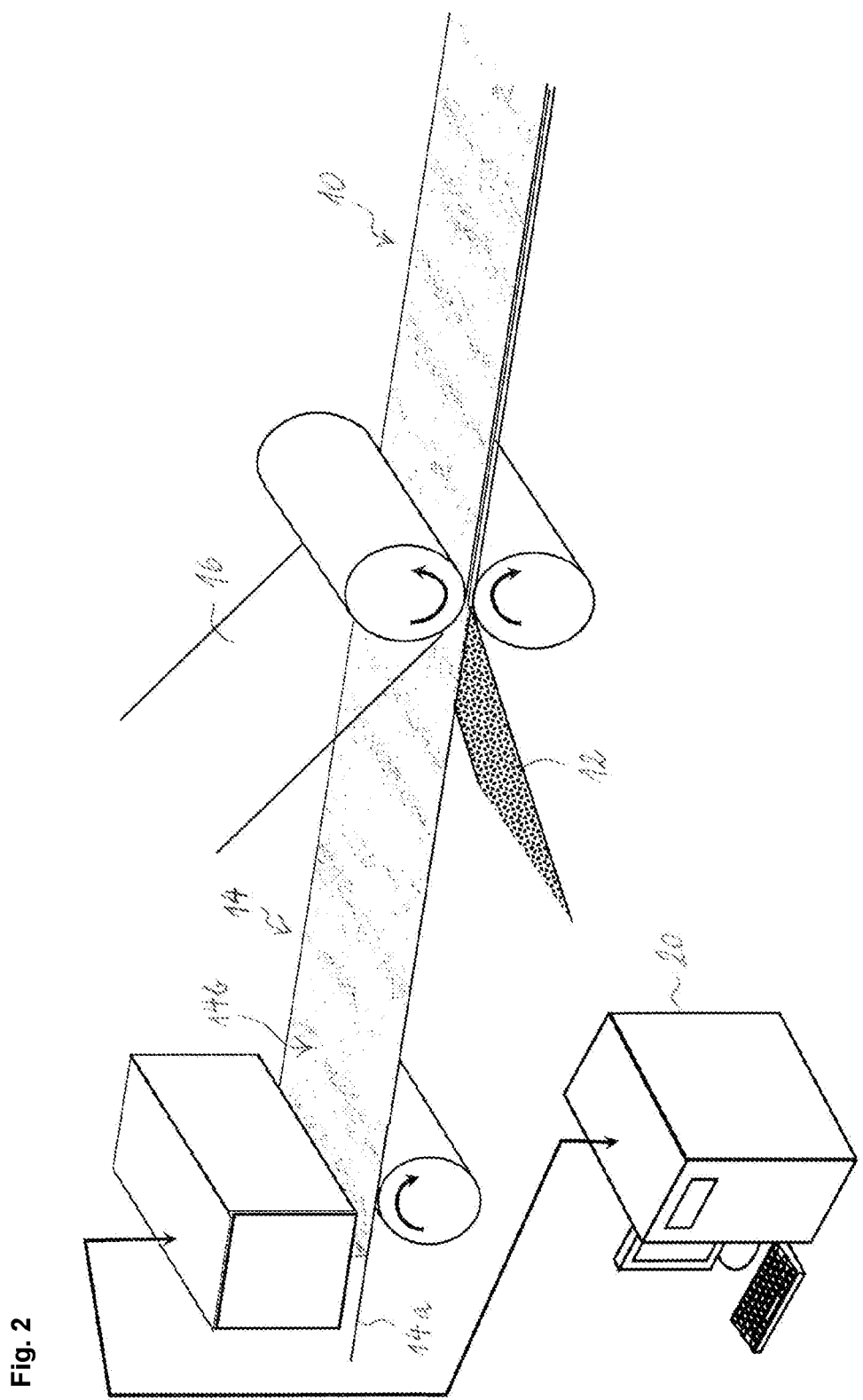
FIG. 2: is a schematic view of a part of a production line for producing a floor covering in accordance with the invention.

The printed décor 14b mimics a surface of natural flooring (in the illustrated example, of hardwood flooring) and is obtained by digitally printing a synthetic (computer-generated) image as schematically illustrated in FIG. 2. The décor is printed preferably using an industrial single-pass digital inkjet printer 18 with at least four colour channels (e.g. CMYK or CcMmYK colour models). Other printers, e.g. a multi-pass printer, could be used as alternatives but are less preferred. After printing, the print layer 14 is assembled with the other layers of the decorative surface covering. In the illustrated example, the assembly of the different layers 12, 14 and 16 is done by lamination but any other suitable process could in fact be used.

The printer 18 is connected with a computer 20 or a computer cluster (e.g. a server farm) that generates the synthetic images to be printed. According to a first preferred embodiment of the invention, the synthetic images are generated on the fly, i.e. in parallel with the printing. After a synthetic image is generated it is added to a queue (e.g. a first-in-first-out buffer) and dispatched to the printer 18. The printer 18 preferably stores the arriving images in a local buffer memory and prints them one after the other. Alternatively, the synthetic images are generated beforehand and stored in a memory from which they are transferred to the printer 18. Yet another option is to continuously generate one "endless" synthetic image, which is streamed or otherwise communicated to the printer 18, where it is assembled again and printed. Image parts that have been printed may thereafter be "forgotten" by the printer. In practice that means that older image parts may be dumped or simply overwritten by new image parts yet to be printed.

Figure 3:
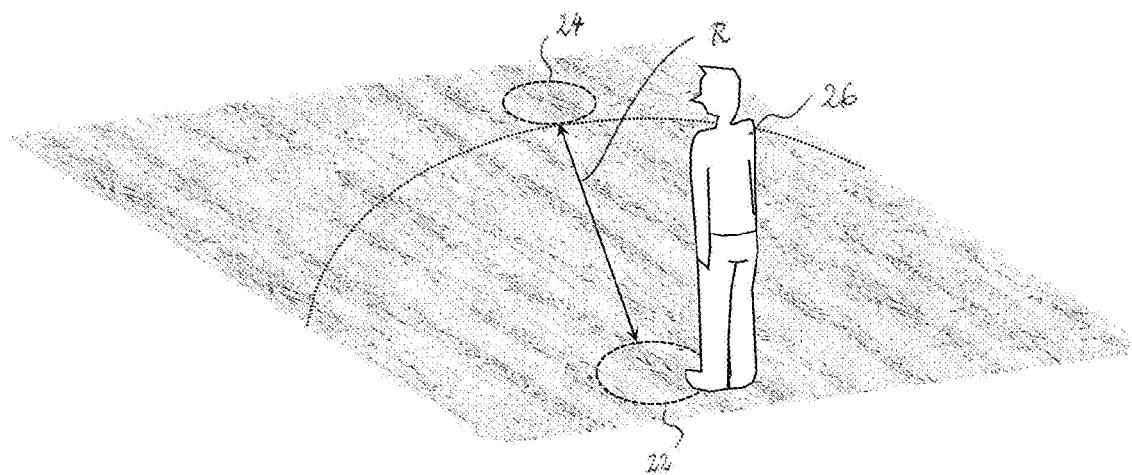
FIG. 3: is an illustration of a synthetic image imitating natural flooring.

As best illustrated in FIGS. 1 and 3, the synthetic image comprises areal and lineal features characteristic of the material to be mimicked. After printing, the synthetic image covers a surface of at least 10 m². (In FIG. 3, the total printed-out area amounts to about 16 m².) The areal and lineal features are distributed over the image surface so as to form a random pattern inspired from nature. The areal and lineal features are distributed in such a way as to reduce the probability of a noticeable repetition. In particular, any geometrically convex subarea of at least 0.01 m² having an aspect ratio not greater than 5 is unique within a radius R of at least 2 m, preferably more, e.g. 3 m, 4 m, 5 m or 7.5 m. FIG. 3 illustrates that a visual motif 22 may appear several times in the synthetic image. If any copy of the visual motif 22 is mirrored (as in FIG. 3) or differently oriented in the plane of the image, it is nevertheless considered as a repetition. Repetition of visual motifs cannot easily be detected by an observer 26 if the above-defined criteria are met.

Figure 4:
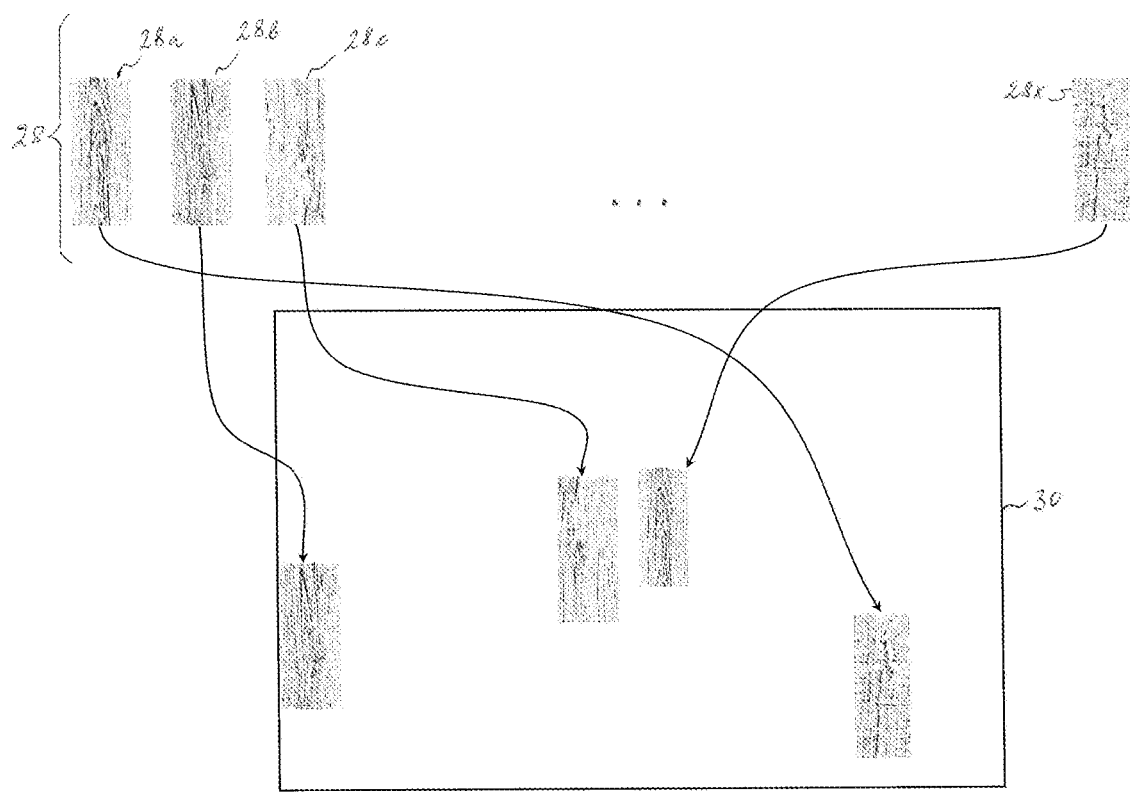
FIG. 4: is an illustration of a part of a synthetic image generation process.
Figure 5:
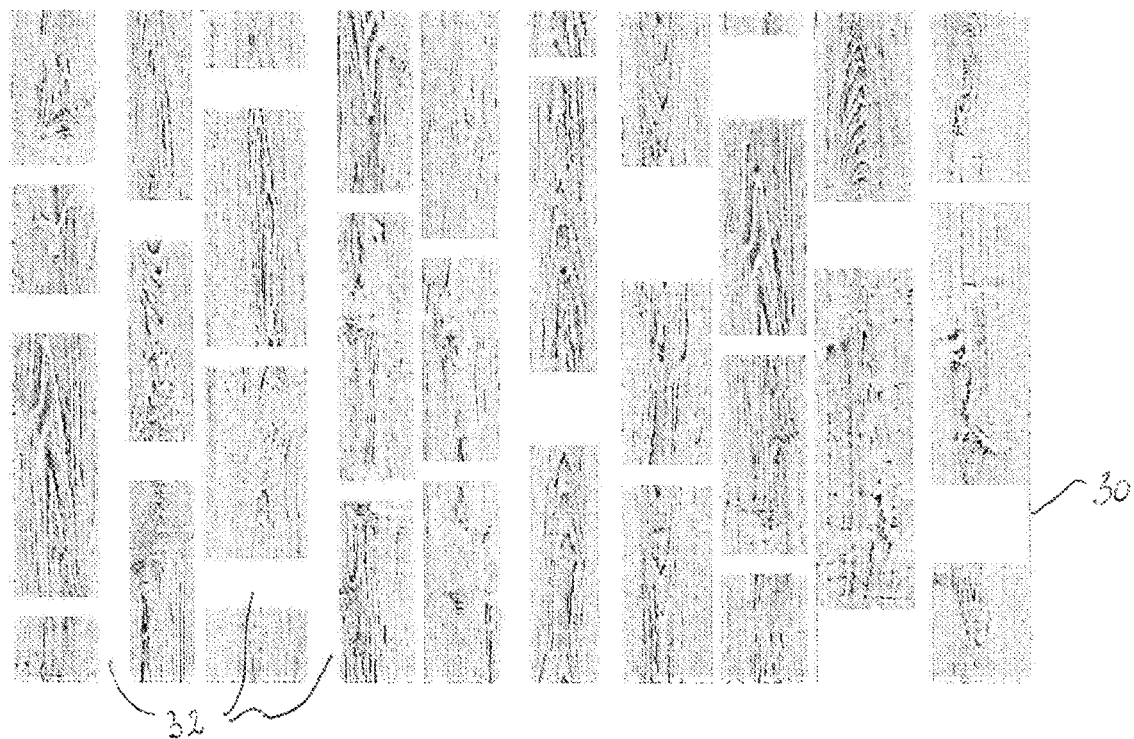
FIG. 5: is an illustration of an intermediate result of a synthetic image generation process.
Figure 6:
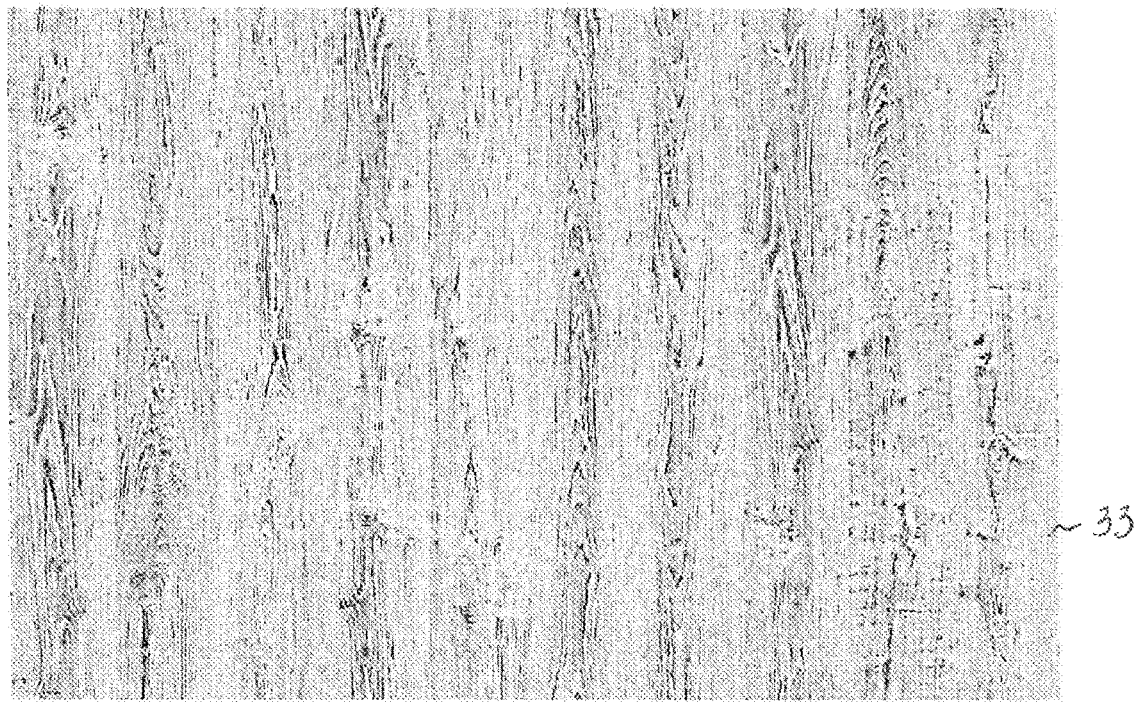
FIG. 6: is a representation of an example of a synthetic image obtained at the end of an image generation process.

FIG. 4-6 illustrate one among several processes for generating a synthetic image usable in the context of the present invention. The illustrated process starts from a database (image library) 28 containing various local prototype motifs, hereinafter also referred to as "base images", 28a, 28b, 28c, 28x. The base images are snippets from photographs and categorized in accordance with the material type (stone, wood, cork, bamboo, etc.), the material sub-type (a more precise designation of the material). The snippets comprise areal and lineal features forming characteristic visual motifs of the natural material. The user may be prompted to enter the type (and sub-type) of material he wants to mimic, whereupon corresponding base images are selected from the database. In case of a large database, a subset of, rather than all of, the base images meeting the selection criteria may be selected. Whereas that could be done by the user, an automatic (e.g. a random) selection is preferred. The base images are then assigned to different positions in a canvas area 30, which is to become the synthetic image.

The distribution is random and respects certain predefined constraints. Preferably, for instance, the base images are placed in such a way that they do not overlap. Another constraint may be that the base images are distributed on a grid defining rows and/or columns and/or a honeycomb pattern, or the like. Yet another constraint may be that the content of each base image is aligned in a predefined way. For instance, in the case of snippets representing visual motifs of a wood floor, one constraint may be that the grain of the wood depicted on the different snippets is more or less aligned.

Last but not least, one constraint may be that each base image is inserted only once into the canvas area or that a second copy of each base image is not inserted into the canvas area within a certain radius from the first copy of the base image. Preferably, each base image in the database comprises an attribute from which it may be inferred by the processor within which radius the base image must not be repeated. Such attribute could be an empirically determined indicator of how eye-catching a base image is in comparison to the other base images. The more eye-catching a base image is, the greater will then be the radius within which the processor will prevent any repetition. As an alternative, the minimum radius for a repetition could be used as said attribute.

FIG. 5 shows that the base images are arranged loosely, so as to leave gaps 32 there between. In the next step, the processor fills up the gaps 32 by extrapolation of the lineal and area features of the base images into the gaps and blending the extrapolated features into one another. The base images may remain unchanged but it is preferred to modify also the base images in order to achieve a homogeneity (especially in terms of colours) across the synthetic image. It is worthwhile noting that the extrapolation is not confined to a linear extrapolation but preferably mimics the features contained in the base images, e.g. by introducing "self-similarity" at different scale. The step of optically blending the base images into one another eventually yields the synthetic image 33 (FIG. 6), which exhibits a generally seamless appearance, i.e. wherein the boundaries of the individual base images are no longer discernible by eye.

It may be worth mentioning that the base images could also be arranged so as to define a dense mosaic in the canvas area (essentially devoid of interstices between the base images). In this case, the step of optically blending the base images into one another requires the modification of the boarder zones of some or all of the base images.

Figure 7:
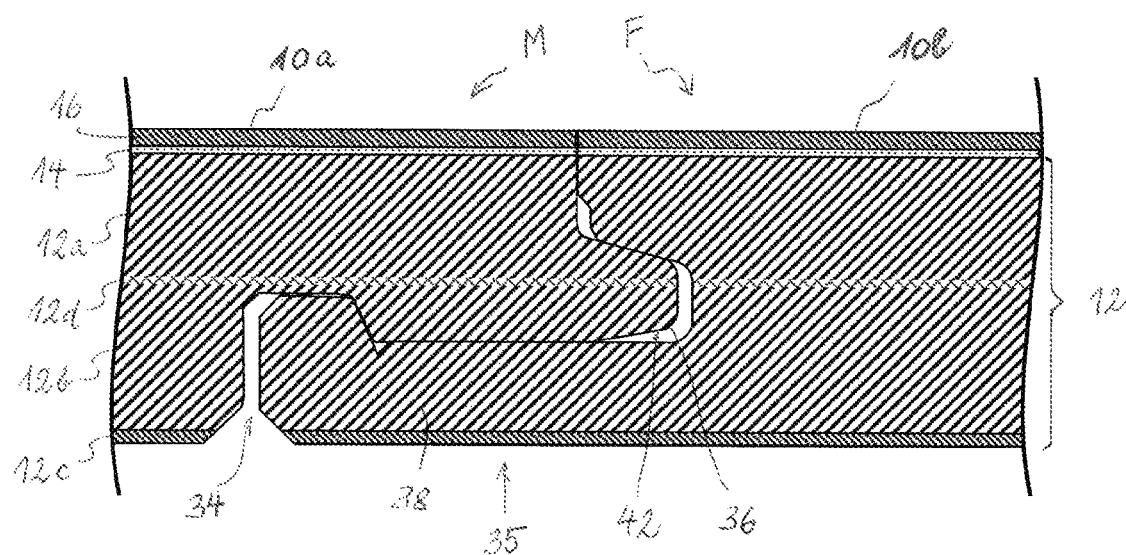
FIG. 7: is a cross-sectional view connectors of adjacent floor covering elements in the coupled state.

After the different layers 12, 14 and 16 have been assembled, the multilayer floor covering 10 is preferably cut into individual elements (planks, panels, tiles or the like). The cutting is preferably achieved in register with the print layer (i.e. along predefined lines). Finally, connection profiles are machined into the side edges of the floor covering elements. The connecting profiles of opposite edges are preferably complementarily shaped, e.g. as male and female profiles. FIG. 7 shows the connection profiles of two adjacent floor covering elements 10a, 10b in the coupled state. The first connection profile M has a recess 34 at the bottom face 35 of the floor covering element and a tongue 36 overhanging the recess 34. The second connection profile F has a protrusion 38 at the bottom face 35 of the floor covering element and a groove 42 for receiving the tongue 36 of the male profile M.

The thickness (or height) of the substructure 12 (including all of its sublayers 12a-d) preferably amounts to between 1 mm and 7.5 mm. The wear layer 16 preferably has a thickness between 0.1 mm and 1.8 mm. The thickness of the print layer 14 preferably amounts to between 0.05 mm and 0.25 mm. The thicknesses of the different layers are preferably chosen such that the floor covering elements 10a, 10b have a total height of 10 mm or less, e.g. 9 mm, 8 mm, 7 mm, 6 mm, 5 mm, 4 mm, 3.5 mm or 3 mm.

Figure 8:
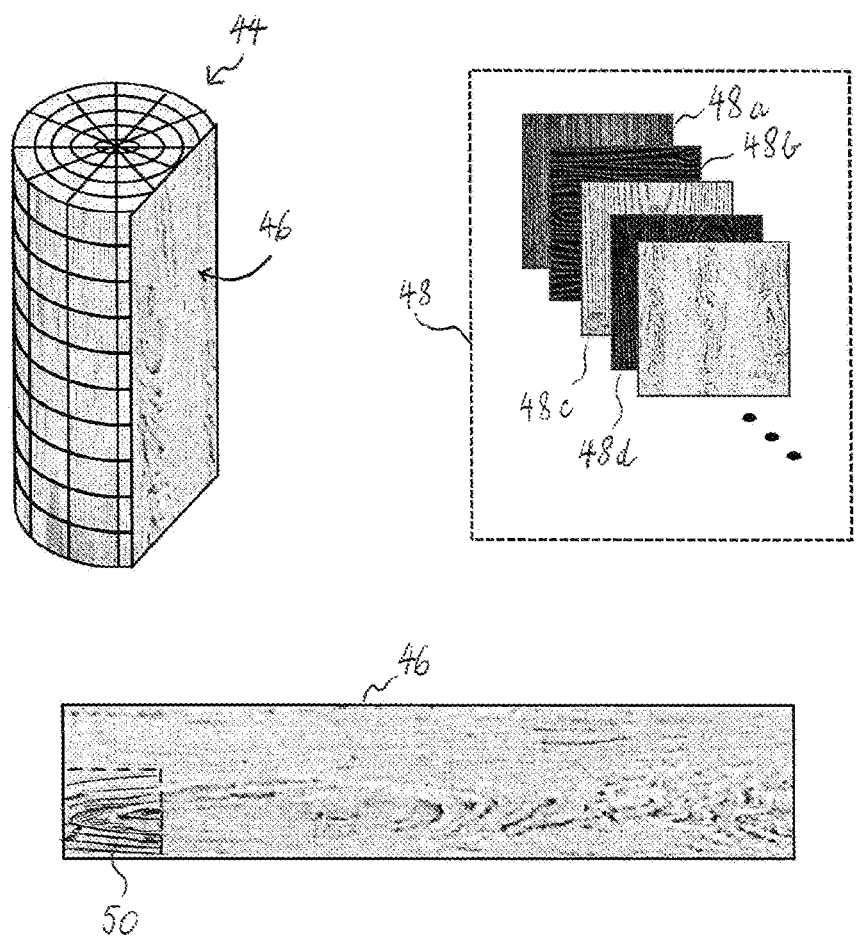
FIG. 8: is a schematic illustration of another synthetic image generation process.

FIG. 8 illustrates a further process for generating a synthetic image usable in the context of the present invention. The process of FIG. 8 uses a 3D model 44 of the material to be mimicked. In FIG. 8, the 3D model represents a tree but that is for illustration only. If, for instance, the material to be mimicked is granite, one would use a 3D model of a granite rock. The 3D model is (virtually) sliced, whereby a 2D surface 46 is obtained. It may be noted that one is not limited to planar cuts of the 3D model. Indeed, one may "carve" out any 2D surface embedded within the 3D model. If not already planar, the 2D surface is then mapped into a plane (preferably using a diffeomorphism or similar transformation). Preferably, the 2D surface is smooth so as to avoid visible discontinuities after the mapping step. The 2D patterns thus obtained may be used for printing if the resolution is sufficient.

With respect to FIG. 8 it is now supposed that the resolution of the 3D model 44 (and thus of the 2D surface 46) is not sufficient for printing and/or a different image is desired. The image generation process uses a database 48 of local prototype motifs 48a, 48b, 48c, 48d . . . . The local prototype motifs 48a, 48b, 48c, 48d, . . . are snippets from photographs and categorized in accordance with the material type (stone, wood, cork, bamboo, etc.), the material sub-type (a more precise designation of the material). The image generation process uses a multiscale approach to generate the synthetic image. The 2D surface 46 obtained from the 3D model is used to coarsely define the structure of the texture. Local prototype motifs (of the same material) from the database 48 are selected and arranged on the 2D surface 46 in such a way that good fit on a coarse scale is achieved. Detail is added using a multiscale locally Gaussian approach. In the end a high-resolution synthetic image is obtained, which, on the coarse scales is similar to the 2D surface 46 but wherein high-resolution detail 50 results from a multivariate Gaussian distribution.

Figure 9:
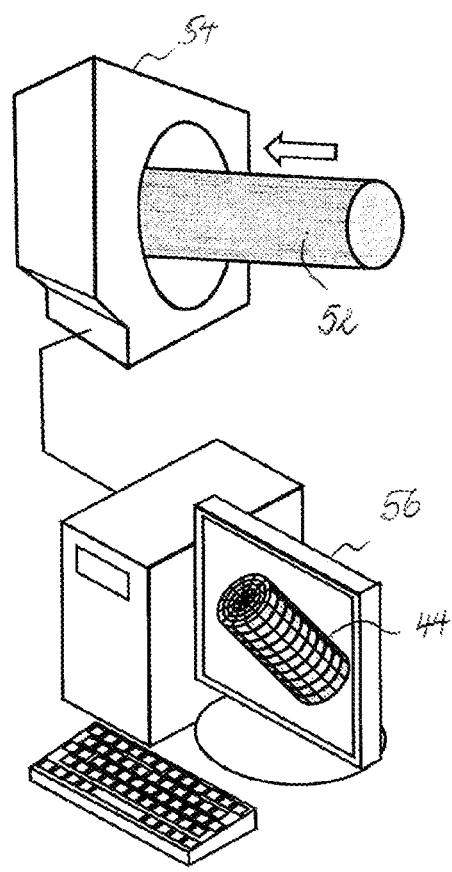
FIG. 9: is a schematic drawing illustrating acquisition of a 3D representation of a sample of a material to be mimicked.

FIG. 9 is an illustration of how a 3D model 44 of a material to be mimicked may be acquired. A sample of the material to be mimicked 52 is scanned by a scanning apparatus 54 in three dimensions using any suitable technology (e.g. X-ray tomography, ultrasound, magnetic resonance tomography, thermographic imaging, photography, etc., or any combination thereof). Acquisition of 3D images may be combined with the acquisition of photographs. Examples of scanning apparatuses are, for instance, available from Microtec (e.g. CT Log™ or Goldeneye™). The data are combined into a 3D virtual model 44, which may be explored and enhanced on a workstation 56, a computer, a notebook, a tablet or even a smartphone, provided the processing power thereof is sufficient to for the purpose.

While specific embodiments have been described herein in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A method of producing a decorative surface covering, comprising:
    generating one or more synthetic images, the generation of the one or more synthetic images including:
        arranging local prototype motifs characteristic of a material to be mimicked in a random manner and generating or preserving continuity between said local prototype motifs in such a way as to yield globally an appearance of the material to be mimicked;
        digitally printing the one or more synthetic images on a printing substrate; and
    assembling said printing substrate with one or more backing layers and/or one or more transparent top layers so as to form said decorative surface covering;
    wherein, before said digital printing of the one or more synthetic images, gravure printing a base coat on said printing substrate.

2. The method as claimed in claim 1, wherein said local prototype motifs comprise photograph snippets of one or more photographs of the material to be mimicked.

3. The method as claimed in claim 1, wherein said local prototype motifs comprise computer-generated snippets imitating distinctive visual motifs of the material to be mimicked.

4. The method as claimed in claim 1, wherein said local prototype motifs are generated and/or arranged in said random manner by rule-based processing using rules selected in accordance with the material to be mimicked.

5. The method as claimed claim 1, wherein said local prototype motifs are blended into one another for generating continuity between said local prototype motifs.

6. The method as claim 1, wherein arranging said local prototype motifs in a random manner comprises
distributing said local prototype motifs in a two-dimensional canvas area in a random manner; and
modifying and completing the prototype motifs so as to optically blend them into one another, thus producing a seamless appearance.

7. The method as in claim 1, wherein the local prototype motifs comprise lineal, areal or volume features and wherein arranging the local prototype motifs in said random manner comprises coordinating the local prototype motifs in an at least three-dimensional space, and retrieving a two-dimensional surface embedded in said space.

8. The method as claimed in claim 7, comprising mapping said two-dimensional surface into a plane.

9. The method as claimed in claim 1, wherein the synthetic image mimics a surface of natural material selected from the group consisting of stone, wood, bamboo, cork and metal.

10. The method as claimed in claim 1, wherein at least part of the prototype motifs are retrieved from an image database.

11. The method as claimed in claim 1, wherein arranging said local prototype motifs comprises preventing repetition of each local prototype motifs within a defined radius, the defined radius preferably amounting to at least 2 m.

12. The method as claimed in claim 1, wherein the local prototype motifs comprise first, eye-catching, prototype motifs and second, containing areal and lineal features forming inconspicuous, prototype motifs.

13. The method as claimed in claim 12, wherein arranging said local prototype motifs is carried out by distributing said first prototype motifs in a random manner and generating continuity between said first prototype motifs comprises distributing said second prototype motifs in-between said first prototype motifs.

14. The method as claimed in claim 1, wherein arranging said local prototype motifs comprises arranging the local prototype motifs as an at least two-dimensional dense mosaic devoid of gaps and wherein generating continuity between said local prototype motifs comprises modifying said prototype motifs so as to eliminate discontinuities between adjacent prototype motifs.

15. The method as claimed in claim 1, wherein arranging said local prototype motifs comprises arranging said local prototype motifs as an at least two-dimensional sparse mosaic with gaps between said local prototype motifs and wherein generating continuity between said local prototype motifs comprises extrapolation of said local prototype motifs into said gaps and/or interpolation of the said local prototype motifs.

16. The method as claimed in claim 1, wherein the method produces a decorative wall or floor covering.

* * * * *